US012056919B2

(12) United States Patent
Toyama

(10) Patent No.: US 12,056,919 B2
(45) Date of Patent: Aug. 6, 2024

(54) DISPLAY CONTROL APPARATUS, METHOD, AND NON-TRANSITORY COMPUTER READABLE MEDIUM STORING PROGRAM

(71) Applicant: NEC Corporation, Tokyo (JP)

(72) Inventor: Hiroaki Toyama, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/911,739

(22) PCT Filed: Mar. 31, 2020

(86) PCT No.: PCT/JP2020/014847
§ 371 (c)(1),
(2) Date: Sep. 15, 2022

(87) PCT Pub. No.: WO2021/199292
PCT Pub. Date: Oct. 7, 2021

(65) Prior Publication Data
US 2023/0127733 A1  Apr. 27, 2023

(51) Int. Cl.
G06V 40/12    (2022.01)
G06F 3/04847  (2022.01)
G06V 10/94    (2022.01)
G06V 10/98    (2022.01)

(52) U.S. Cl.
CPC ........ G06V 10/993 (2022.01); G06F 3/04847 (2013.01); G06V 10/945 (2022.01); G06V 40/1359 (2022.01)

(58) Field of Classification Search
CPC ............ G06V 10/993; G06V 40/1359; G06V 10/945; G06F 3/04847
See application file for complete search history.

(56) References Cited

U.S. PATENT DOCUMENTS

| 2006/0120575 | A1 | 6/2006 | Ahn et al. |
| 2013/0243278 | A1 | 9/2013 | Saito et al. |
| 2013/0287270 | A1 | 10/2013 | Harper |
| 2014/0331059 | A1 | 11/2014 | Rane et al. |
| 2017/0177918 | A1* | 6/2017 | Boshra ................ G06T 5/003 |
| 2017/0243042 | A1* | 8/2017 | Walch ................. G06V 40/70 |

(Continued)

FOREIGN PATENT DOCUMENTS

JP   2013-196295 A   9/2013
JP   2014-219967 A   11/2014

(Continued)

OTHER PUBLICATIONS

International Search Report for PCT Application No. PCT/JP2020/014847, mailed on Jun. 30, 2020.

(Continued)

Primary Examiner — Yuzhen Shen
(74) Attorney, Agent, or Firm — Sughrue Mion, PLLC

(57) ABSTRACT

A display control apparatus includes: a setting unit that sets a parameter according to an input of a user; a determination unit that determines, for each of areas of a fingerprint image obtained by dividing the fingerprint image, whether quality of a ridge pattern in the area is satisfactory or not based on the parameter; and a first display control unit that makes display means display the fingerprint image according to a result of the determination.

1 Claim, 11 Drawing Sheets

(56) References Cited

U.S. PATENT DOCUMENTS

| | | | | |
|---|---|---|---|---|
| 2018/0089484 A1* | 3/2018 | Satou | ................. | G06V 40/1376 |
| 2019/0188443 A1* | 6/2019 | Matsunami | .......... | G06V 10/993 |
| 2019/0266386 A1* | 8/2019 | Martin | .................... | G06F 17/18 |
| 2020/0380392 A1* | 12/2020 | Suzuki | ................... | G06N 20/00 |
| 2021/0232801 A1* | 7/2021 | Siddiqui | ................. | G06N 7/01 |

FOREIGN PATENT DOCUMENTS

| | | |
|---|---|---|
| JP | 2019-109619 A | 7/2019 |
| WO | 2007/088926 A1 | 8/2007 |

OTHER PUBLICATIONS

JP Office Action for JP Application No. 2022-513002, mailed on Jul. 11, 2023 with English Translation.

* cited by examiner

DISPLAY CONTROL APPARATUS, METHOD, AND NON-TRANSITORY COMPUTER READABLE MEDIUM STORING PROGRAM

This application is a National Stage Entry of PCT/JP2020/014847 filed on Mar. 31, 2020, the contents of all of which are incorporated herein by reference, in their entirety.

TECHNICAL FIELD

The example embodiments relate to a display control apparatus, a method, and a non-transitory computer readable medium storing a program, and in particular to a technology for displaying a fingerprint image.

BACKGROUND ART

Patent Literature 1 discloses a biometric authentication apparatus that divides a fingerprint image into a plurality of areas and, except for unclear areas thereof, makes corrections to the areas. The biometric authentication apparatus disclosed in Patent Literature 1 can prevent erroneous feature values from being extracted from the unclear areas.

CITATION LIST

Patent Literature

Patent Literature 1: Japanese Unexamined Patent Application Publication No. 2019-109619

SUMMARY OF INVENTION

Technical Problem

It should be noted that there has been a problem that it is difficult for an operator to appropriately classify areas in a fingerprint image into high quality parts and low-quality parts.

The present disclosure has been made in order to solve the above-described problem, and an object thereof is to provide a display control apparatus, a method, and a program capable of displaying a fingerprint image based on an input of a user.

Solution to Problem

A display control apparatus according to the present disclosure includes: setting means for setting a parameter according to an input of a user; determination means for determining, for each of areas of a fingerprint image obtained by dividing the fingerprint image, whether quality of a ridge pattern in the area is satisfactory or not based on the parameter; and first display control means for making display means display the fingerprint image according to a result of the determination.

A display control method according to the present disclosure includes: setting, by a computer, a parameter according to an input of a user; determining, by the computer, for each of areas of a fingerprint image obtained by dividing the fingerprint image, whether quality of a ridge pattern in the area is satisfactory or not based on the parameter; and making, by the computer, display means display the fingerprint image according to a result of the determination.

A display control program according to the present disclosure causes a computer to perform: a process for setting a parameter according to an input of a user; a process for determining, for each of areas of a fingerprint image obtained by dividing the fingerprint image, whether quality of a ridge pattern in the area is satisfactory or not based on the parameter; and a process for making display means display the fingerprint image according to a result of the determination.

Advantageous Effects of Invention

According to the present disclosure, it is possible to provide a display control apparatus, a method, and a program capable of displaying a fingerprint image based on an input of a user.

EXAMPLE EMBODIMENT

Figure 1:
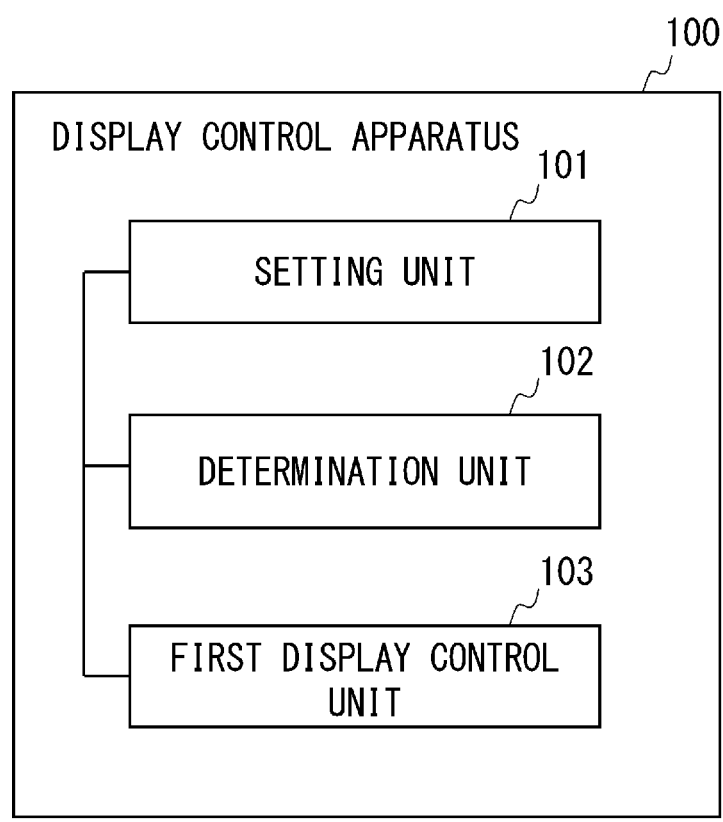
FIG. 1 is a block diagram showing a configuration of a display control apparatus according to a first example embodiment.

An example embodiment according to the present disclosure will be described hereinafter in detail with reference to the drawings. The same reference numerals (or symbols) are assigned to the same or corresponding elements throughout the drawings, and redundant descriptions thereof are omitted as appropriate for clarifying the description.

First Example Embodiment

FIG. 1 is a block diagram showing a configuration of a display control apparatus 100 according to a first example embodiment. The display control apparatus 100 includes a setting unit 101, a determination unit 102, and a first display control unit 103. The setting unit 101 sets a parameter according to an input of a user. The parameter is, for example, a regularization parameter in a regression with a regularization term performed by the determination unit 102. The regularization parameter is also referred to as a regularization strength.

The determination unit 102 determines, for each of areas of a fingerprint image obtained by dividing the fingerprint image, whether the quality of a ridge pattern in the area is satisfactory or not based on the parameter set by the setting unit 101. Each of the divided areas may be one pixel. The determination unit 102 determines whether the quality of the ridge pattern in the area, or in an area at and around this area is satisfactory or not. When there is blurring or the like in the ridge pattern, it is determined that the quality of this ridge pattern is low. In the case where each of the divided areas is one pixel, the determination unit 102 may determine whether the quality of the ridge pattern in an area composed of several pixels at and around the pixel of interest is satisfactory or not.

For example, the determination unit 102 performs a regression with regularization based on the regularization parameter set by the setting unit 101, and performs fitting for the ridge pattern using a plurality of template images. Then, the determination unit 102 may determine whether the quality of the ridge pattern is satisfactory or not according to the result of the fitting.

The first display control unit 103 makes (e.g., instructs) a display unit displays the fingerprint image according to the result of the determination. The display unit is a display device such as a display. The first display control unit 103 may, for example, generate a display image in which a poor-quality area is colored a predetermined background color, and make the display unit display the generated display image.

Figure 2:
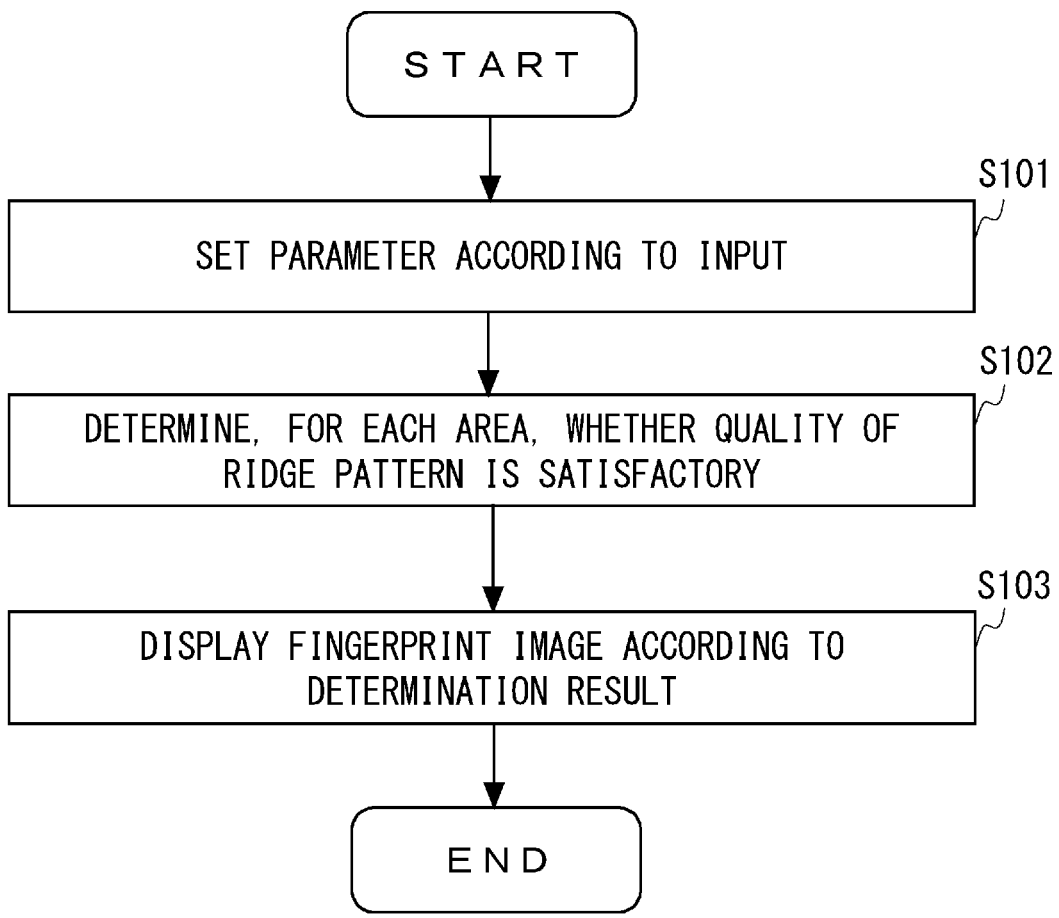
FIG. 2 is a flowchart showing a flow of a display control method according to the first example embodiment.

FIG. 2 is a flowchart showing a flow of a display control method according to the first example embodiment. Firstly, the setting unit 101 sets a parameter according to an input of a user (Step S101). Next, the determination unit 102 determines, for each area, whether the quality of the ridge pattern is satisfactory or not based on the parameter set in the step S101 (Step S102). Lastly, the first display control unit 103 makes (e.g., instructs) the display unit display the fingerprint image according to the result of the determination made in the step S102 (Step S103).

As described previously, in the related art, it has not been possible to appropriately classify areas in a fingerprint image into normal areas and defective areas. In contrast to this, according to this example embodiment, a user can check a display image and then set an appropriate parameter, so that it is possible to appropriately classify areas in a fingerprint image.

Note that the display control apparatus 100 includes a processor, a memory, and a storage device (not shown). Further, a computer program in which processes of a display control method according to this example embodiment are implemented is stored in the storage device. Further, the processor loads the computer program from the storage device into the memory and executes the loaded computer program. In this way, the processor implements the functions of the setting unit 101, the determination unit 102, and the first display control unit 103.

Alternatively, each of the setting unit 101, the determination unit 102, and the first display control unit 103 may be implemented by dedicated hardware. Alternatively, some or all of the components of each apparatus may be implemented by general-purpose or dedicated circuitry, a processor, or a combination thereof. These components may be implemented by using a single chip or may be implemented by using a plurality of chips connected through a bus. Some or all of the components of each apparatus may be implemented by a combination of the above-described circuitry or the like and the program. Further, a CPU (Central Processing Unit), a GPU (Graphics Processing Unit), an FPGA (Field-Programmable Gate Array), or the like can be used as the processor.

Further, in the case where some or all of the components of the display control apparatus 100 are implemented by a plurality of information processing apparatuses, circuitry, or the like, the plurality of information processing apparatuses, circuitry, or the like may be disposed in one place in a concentrated manner or in a plurality of places in a distributed manner. For example, the information processing apparatus, circuitry, or the like may be implemented in a form in which the components or the like are connected through a communication network, i.e., may be implemented as a client-server system, a cloud computing system, or the like. Further, the functions of the display control apparatus 100 may be provided in the form of SaaS (Software as a Service).

Second Example Embodiment

Figure 3:
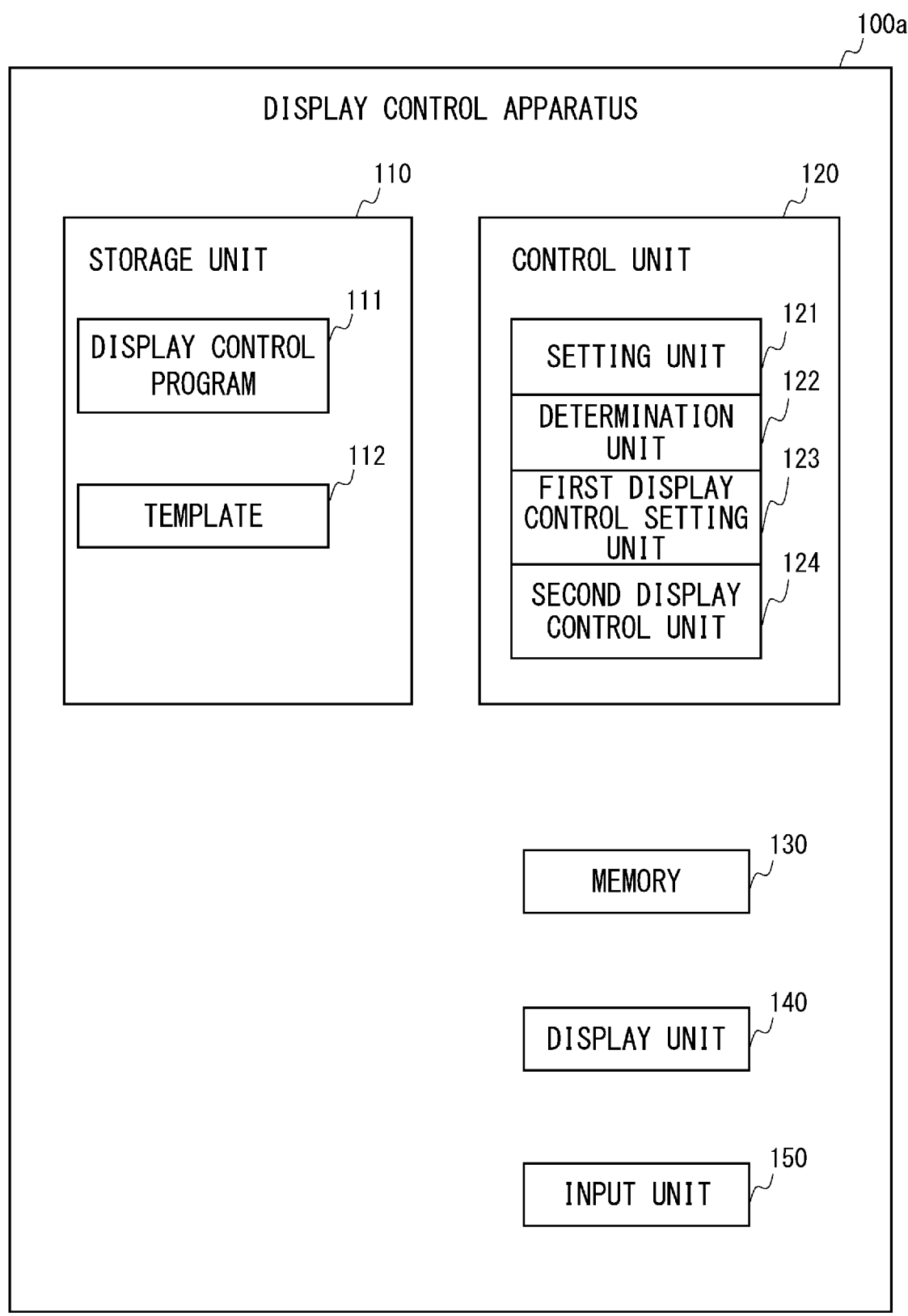
FIG. 3 is a block diagram showing a configuration of a display control apparatus according to a second example embodiment.

FIG. 3 is a block diagram showing a configuration of a display control apparatus 100a according to a second example embodiment. The display control apparatus 100a includes a storage unit 110, a control unit 120, a memory 130, a display unit 140, and an input unit 150.

The storage unit 110 is a storage device such as a hard disk drive or a flash memory. The control unit 120 controls each of the functions of the display control apparatus 100a. The memory 130 is a volatile storage device such as a RAM (Random Access Memory), and is a storage area for temporarily holding information during the operation of the control unit 120. The display unit 140 is an interface connected to a display device such as a display. The input unit 150 is an input interface connected to an input device such as a mouse or a keyboard.

The storage unit 110 stores at least a display control program 111 and templates 112. The display control program 111 is a computer program in which a display control method according to this example embodiment is implemented. The templates 112 are emphasized images obtained by extracting stripe patterns from a fingerprint image. The templates 112 may be, for example, emphasized images obtained by performing filtering processes on a fingerprint image by using Gabor filters.

The templates 112 may include a plurality of types of template images in which widths (pitches) of ridges are different from one template image to another, and may include a plurality of types of template images in which directions of ridges are different from one template image to another. The templates 112 may include, for example, 24 types of template images, i.e., six types of template images in which directions of ridges are different from one types of template images to another, and each of which (i.e., each of the six types) includes four types of template images in which pitches of ridges are different from one template image to another.

Figure 4:
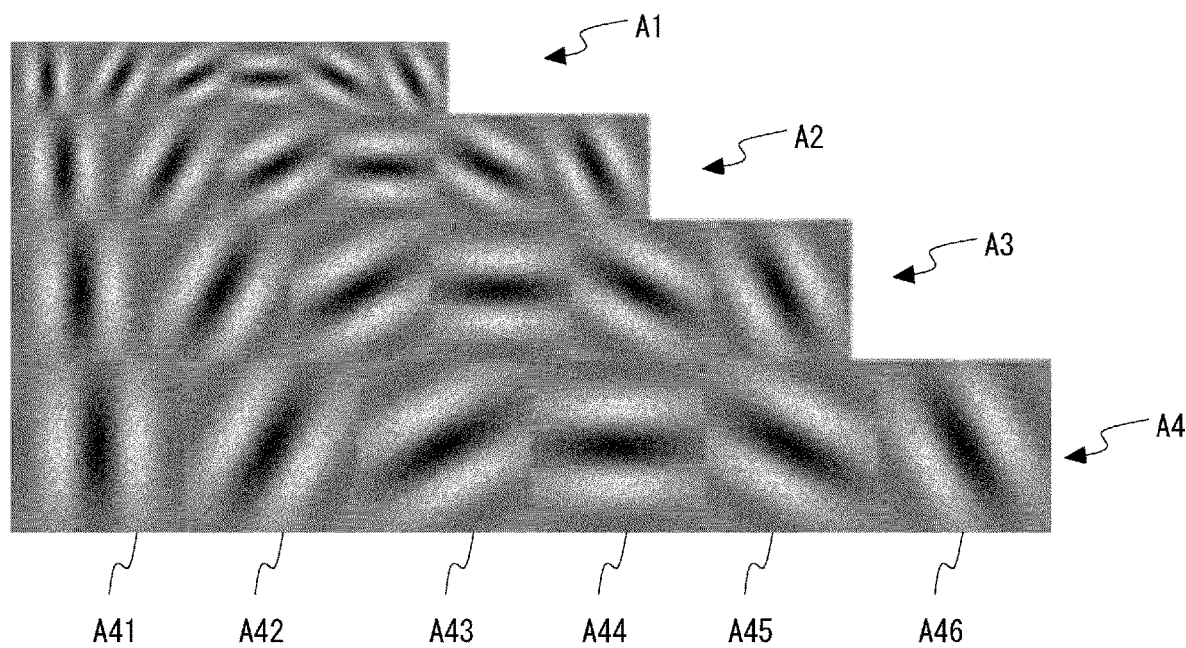
FIG. 4 shows an example of Gabor filters used to generate template images.

A method of generating template images by performing filtering processes will be described hereinafter. FIG. 4 collectively shows 24 types of Gabor filters in one image. By performing filtering processes on a fingerprint image using 24 types Gabor filters, 24 types of emphasized images are obtained.

Six types of filters, which are horizontally arranged, indicated by a symbol A1 have the same pitch as each other and directions different from each other. The same applies to filterers indicated by symbols A2, A3 and A4. The pitches of the filter groups A1 to A4 differ from each other. Note that six types of filters included in the filter group A4 are referred to as filters A41 to A46, respectively. The filters A41 to A46 have the same pitch as each there, but have directions different from each other. Further, the pitches of the filters A41 to A46 are different from those of the filterers included in the filter groups A1 to A3.

Figure 5:
FIG. 5 shows an example of a fingerprint image.
Figure 6:
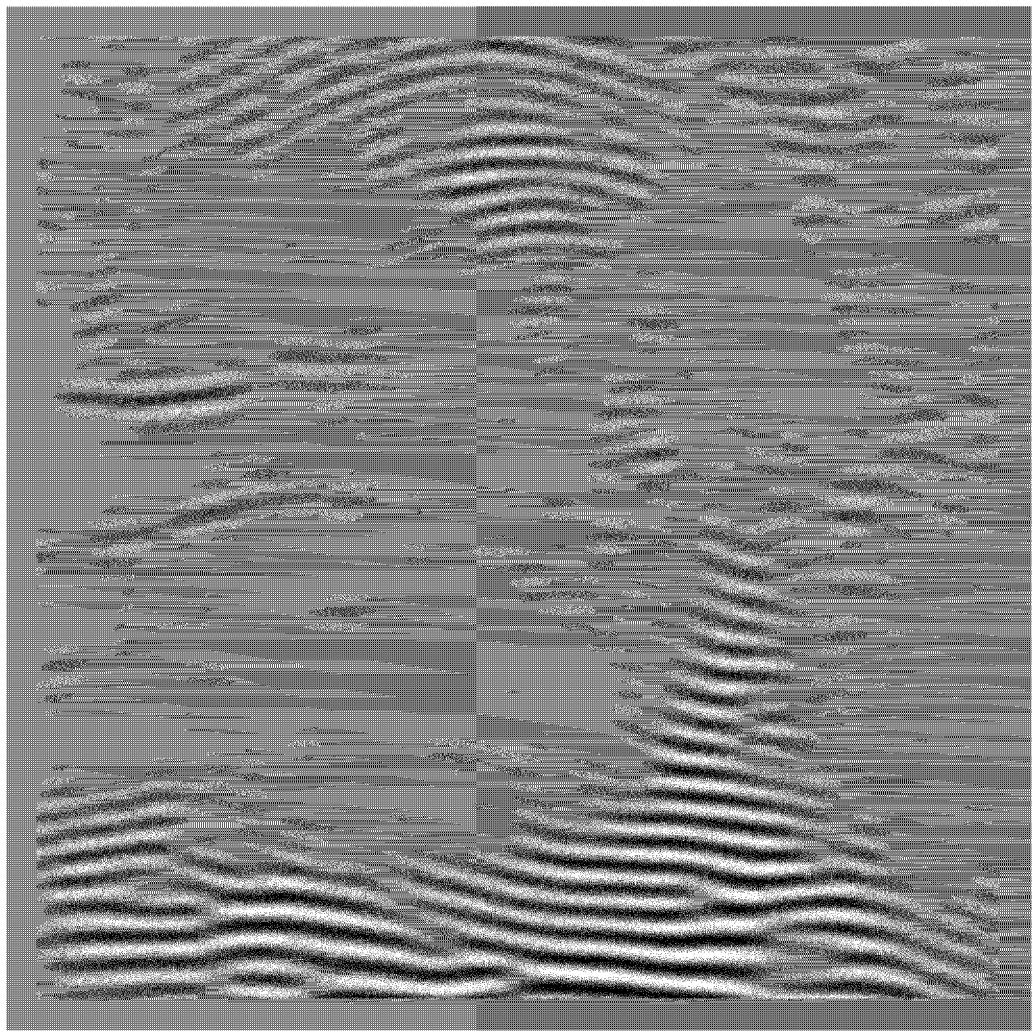
FIG. 6 shows an emphasized image obtained by applying a Gabor filter to a fingerprint image.

FIG. 5 is an example of a fingerprint image. As an example, FIG. 6 shows a result of a case where the filter A44 is applied to this fingerprint image. By applying the filter A44 to the fingerprint image, a predetermined pitch and a horizontal component are extracted from the fingerprint image. The image shown in FIG. 6 is an example of a template image included in the templates 112. That is, by performing filtering processes on a fingerprint image by using the 24 types of filters shown in FIG. 4, it is possible to generate 24 types of template images from the fingerprint image.

Figure 7:
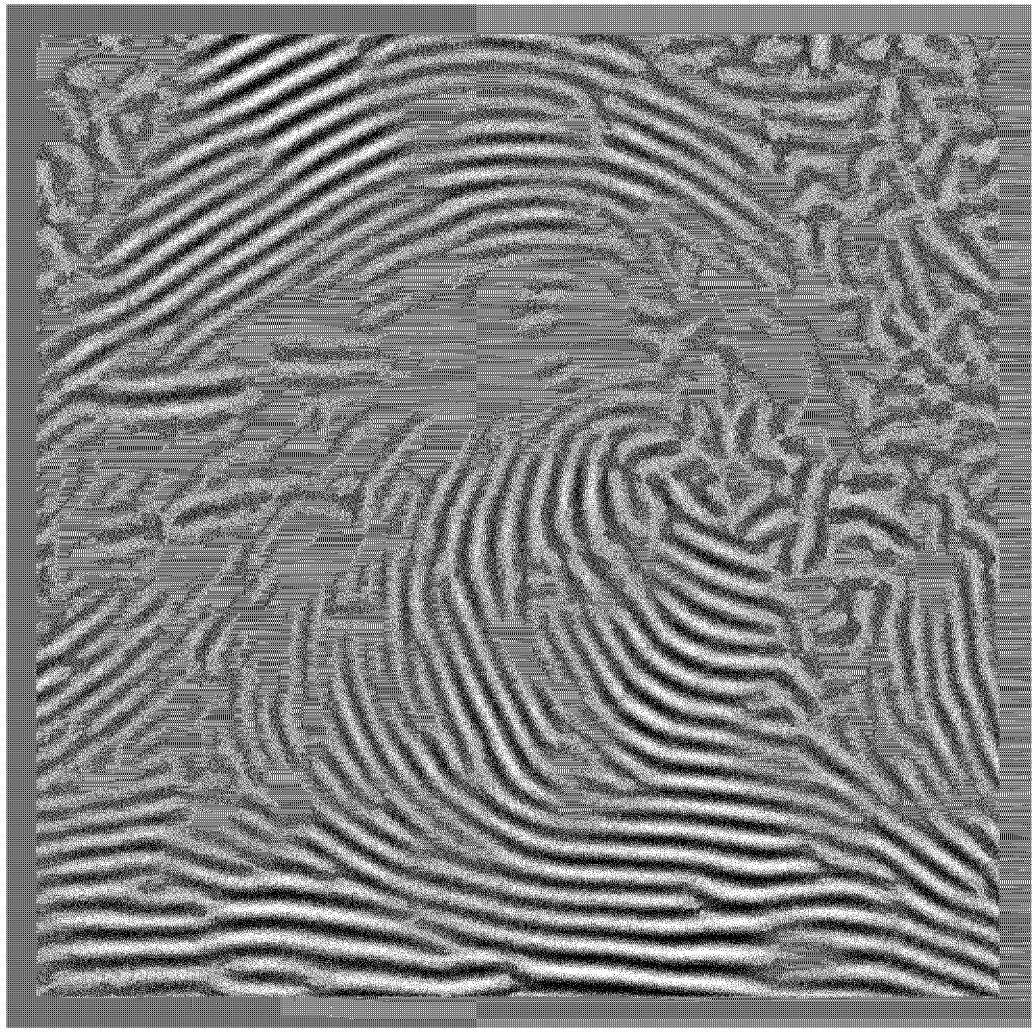
FIG. 7 shows a composite image obtained by combining a plurality of emphasized images having different directions.

Note that FIG. 7 is an image that is obtained by combining emphasized images each of which is obtained by applying a respective one of the filters A41 to A46 to a fingerprint image. It is possible to reproduce the fingerprint image by combining the emphasized images. As will be described later, a determination unit 122 of the control unit 120 can determine the quality of each area from the number of template images that have been required to reproduce the ridge pattern.

The control unit 120 will be described by referring to FIG. 3 again. The control unit 120 loads the display control program 111 from the storage unit 110 into the memory 130 and executes the loaded display control program 111. In this way, the control unit 120 implements the functions of a setting unit 121, a determination unit 122, a first display control unit 123, and a second display control unit 124. Note that the setting unit 121 is an example of the setting unit 101, the determination unit 122 is an example of the determination unit 102. Further, the first display control unit 123 is an example of the first display control unit 103.

The setting unit 121 sets a parameter according to an input from the input unit 150. The parameter is used when the determination unit 122 calculates, for each area, an evaluation value representing the quality of the area. The input may be an operation performed for a slider bar displayed by the second display control unit 124 (which will be described later). The determination unit 122 determines, for each of areas obtained by dividing the fingerprint image, whether the quality of the ridge pattern in the area is satisfactory or not based on the above-described parameter. For example, the determination unit 122 may determine, for each pixel, whether the quality of the pixel is satisfactory or not.

The determination unit 122 performs a regression with a regularization term based on a regularization parameter set by the setting unit 121. The regression with a regularization term is, for example, a Lasso regression. Note that the determination unit 122 performs fitting for the ridge pattern by using a plurality of template images. That is, the determination unit 122 reproduces the ridge pattern as a linear sum of a plurality of template images. In other words, it can be said that the determination unit 122 optimizes a regression coefficient. Then, the determination unit 122 determines whether the quality of the ridge pattern is satisfactory or not according to the result of the above-described fitting.

For example, the determination unit 122 can determine the quality of the ridge pattern based on the number of template images for which, as the result of the fitting, the regression coefficient is any value other than zero. In other words, the determination unit 122 calculates an evaluation value based on the number of template images that are required to reproduce the ridge pattern, and then can determine the quality of the ridge pattern according to the evaluation value.

It is considered that when the quality of the ridge pattern in each area is high, the direction, the line thickness, and the like of the ridge pattern are constant. In such a case, the ridge pattern can be reproduced by using a small number of template images. On the other hand, a ridge pattern in a low-quality area becomes a complex stripe pattern, so that the number of templates required to reproduce the area is large. Therefore, for example, when the number of template images required to reproduce the ridge pattern is equal to or greater than a predetermined number, the determination unit 122 can determine that the quality of the area is defective (i.e., poor or unsatisfactory).

The result of the fitting performed by the determination unit 122 also changes according to the regularization parameter set by the setting unit 121. When the regularization parameter is increased, the number of template images required to reproduce the ridge pattern increases, so that the number of areas of which the quality is determined to be defective increases. Conversely, when the setting unit 121 decreases the regularization parameter, the number of areas of which the quality is determined to be defective decreases.

The first display control unit 123 makes (e.g., instructs) the display unit 140 display the fingerprint image according to the result of the determination by the determination unit 122. For example, the first display control unit 123 may generate a display image in which pixels in a poor-quality area are colored a predetermined background color, and makes the display unit 140 display the generated display image.

Figure 8:
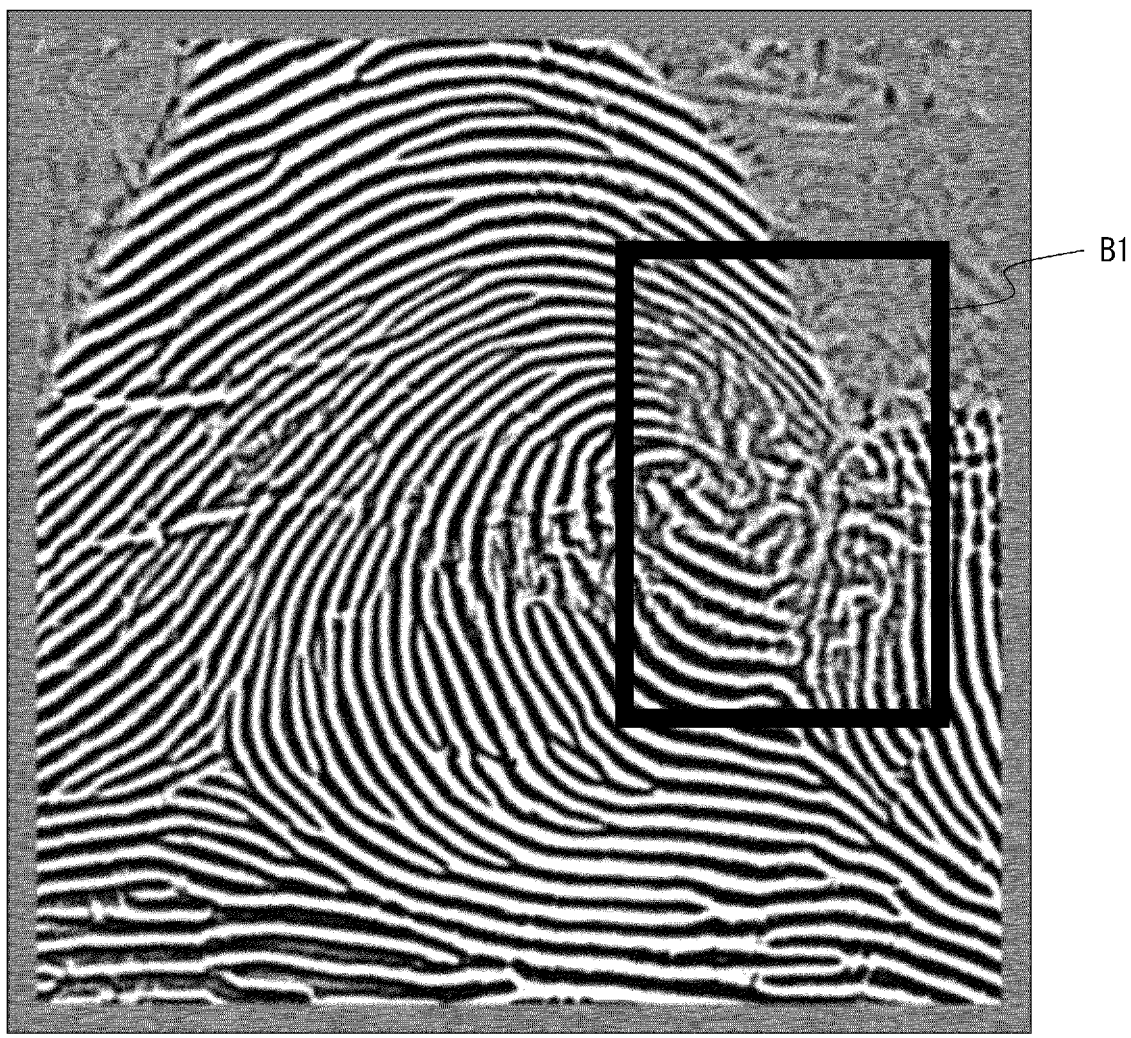
FIG. 8 shows an example of a display image when a parameter is set to a low value.
Figure 9:
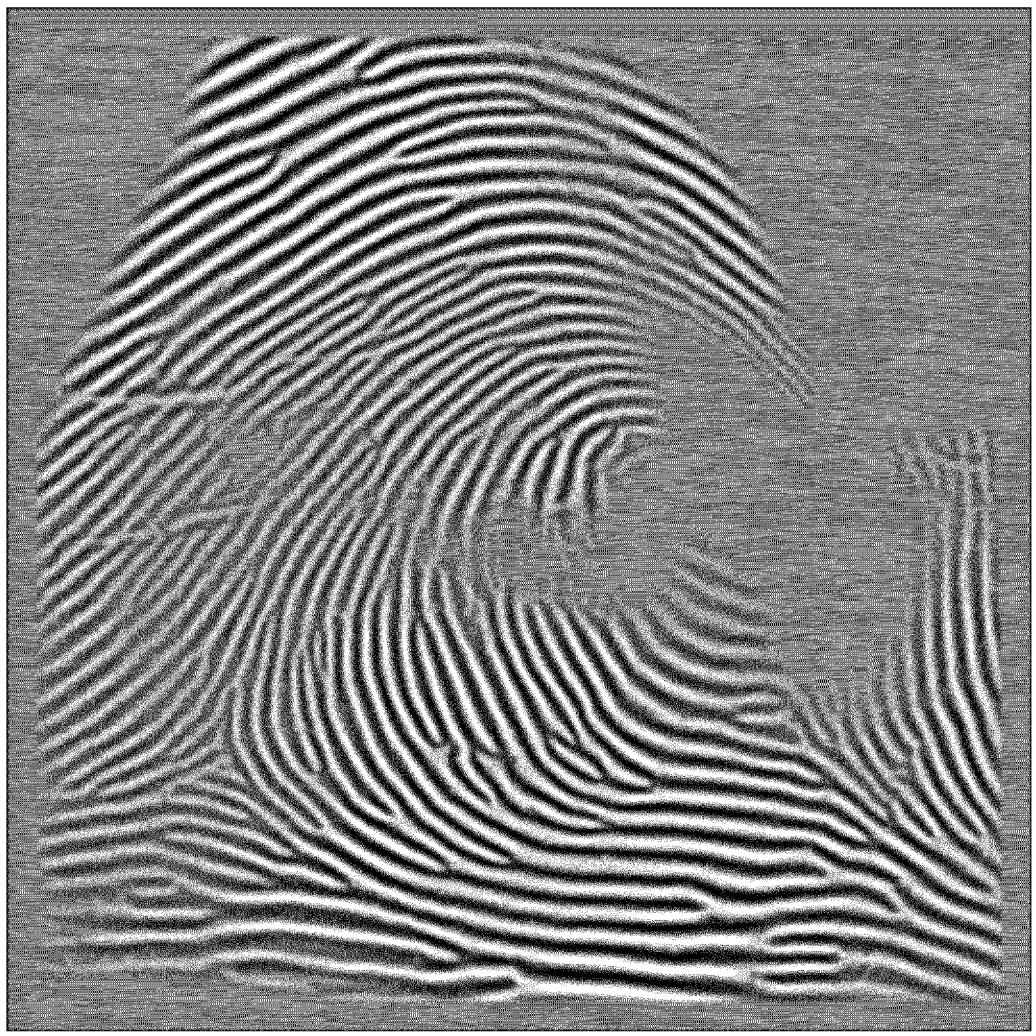
FIG. 9 shows an example of a display image when the parameter is set to a medium value.
Figure 10:
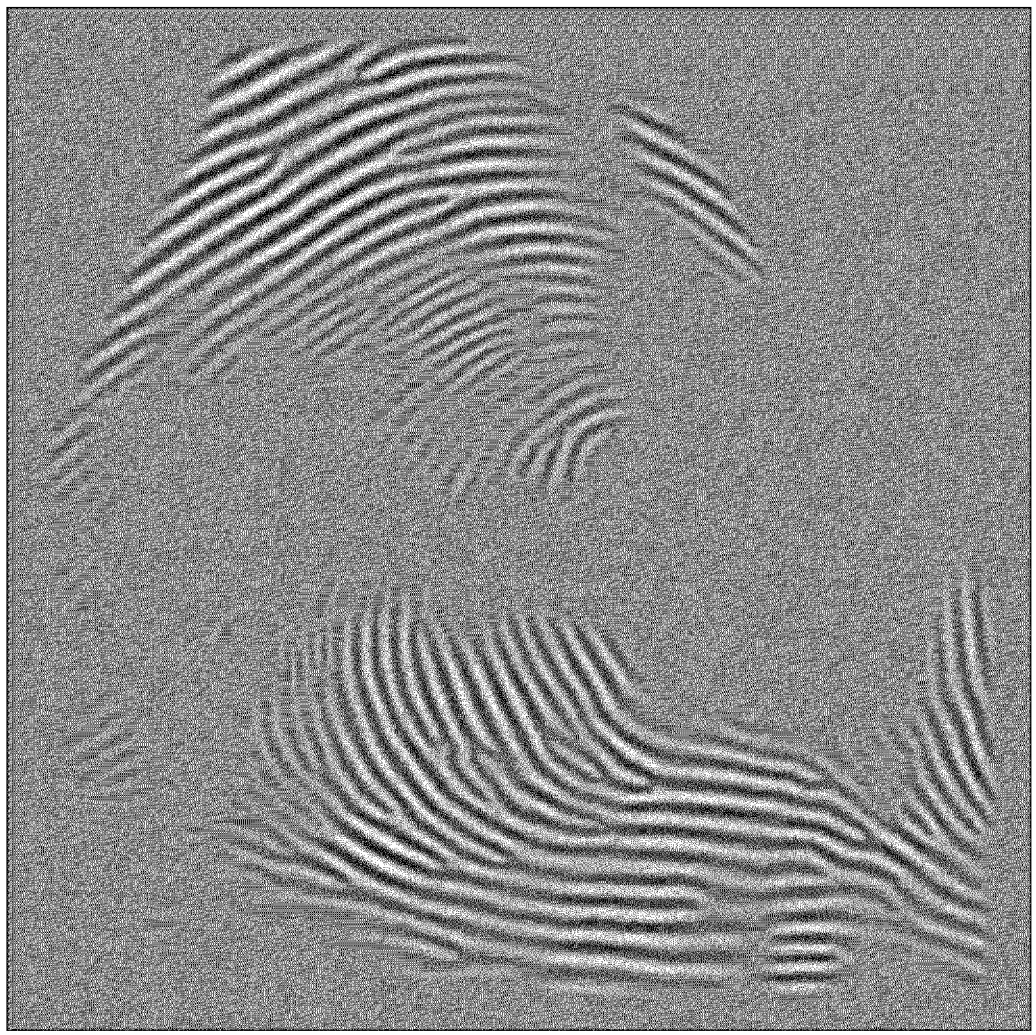
FIG. 10 shows an example of a display image when the parameter is set to a high value.

FIGS. 8, 9 and 10 show examples of display images displayed by the first display control unit 123. FIG. 8 shows a display image in the case where the regularization parameter is the smallest among those of the display images shown in FIGS. 8 to 10. In FIG. 8, the area of which the quality is determined to be defective (i.e., poor or unsatisfactory) is small, and for example, an image of a low-quality area, indicated by a symbol B1, is also shown.

FIG. 9 shows a display image when the regularization parameter is increased from that in FIG. 8. The area of which the quality is determined to be defective (i.e., poor or unsatisfactory) is increased from that in FIG. 8, and the defective area in the box indicated by the symbol B1 shown in FIG. 8 is colored the background color. FIG. 10 shows a display image when the regularization parameter is further increased from that in FIG. 9. The area of which the quality is determined to be defective (i.e., poor or unsatisfactory) is increased from that in FIG. 9, and most of the area in the fingerprint image is colored the background color.

Figure 11:
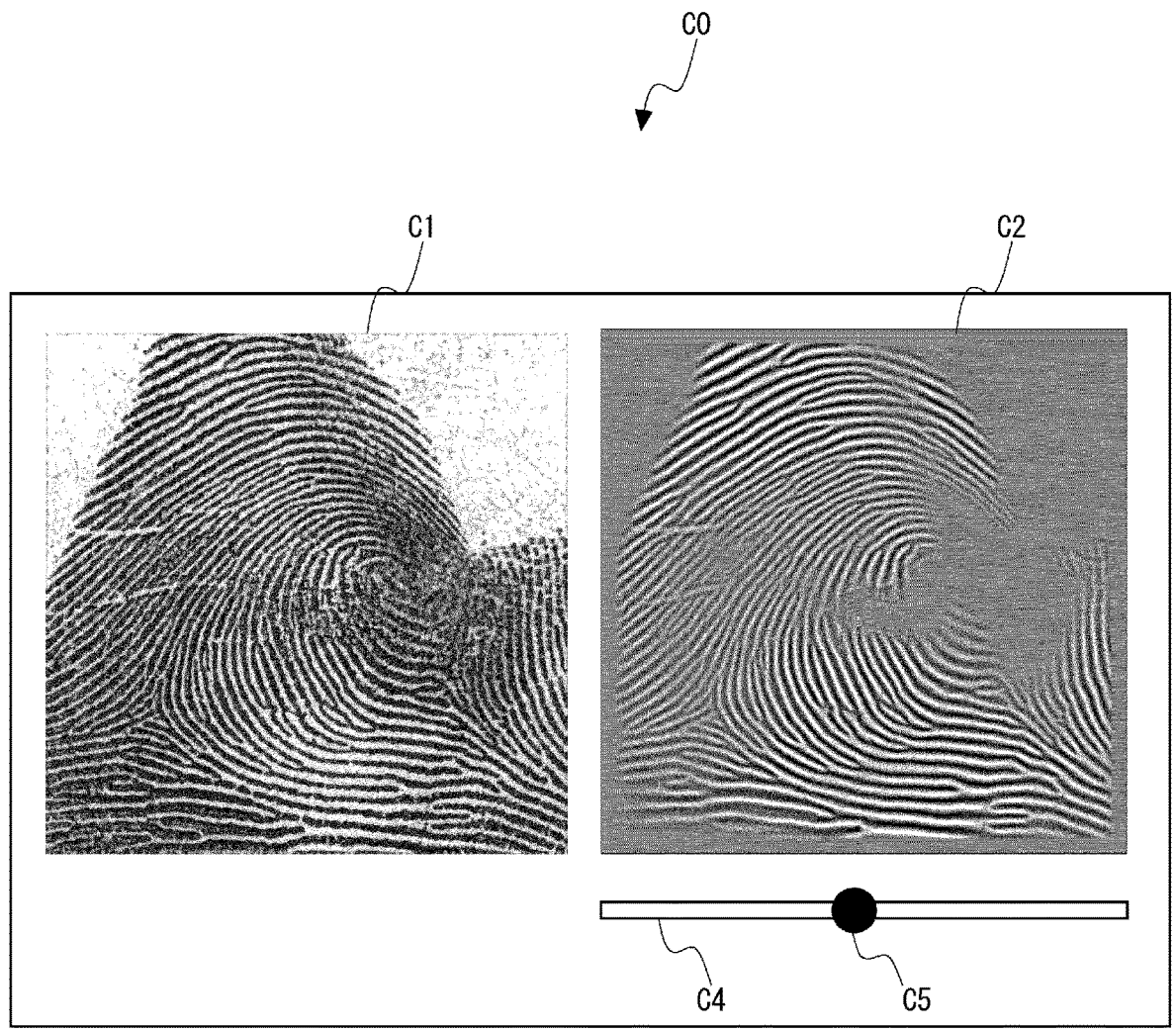
FIG. 11 shows an example of a display screen displayed by the display control apparatus according to the second example embodiment.

FIG. 11 shows an example of a display screen (i.e., a displayed window) C0 that the display control apparatus 100a makes (e.g., instructs) the display unit 140 display. The first display control unit 123 makes the display unit 140 display a display image C2 according to the result of the determination by the determination unit 122. In FIG. 11, the image shown in FIG. 9 is displayed as the image C2. The first display control unit 123 may display a fingerprint image C1 for which the quality determination is performed. In such a case, a user can determine whether the setting of the regularization parameter is appropriate or not by comparing the fingerprint image C1 with the original fingerprint image.

The second display control unit 124 shown in FIG. 3 displays, for example, a slider bar C4 and a slider C5 shown in FIG. 11. In such a case, the setting unit 121 sets the regularization parameter according to the position of the slider C5 on the slider bar C4.

When the user moves the slider C5 to the right end of the slider bar C4, the setting unit 121 sets the regularization parameter to the maximum value. For example, the first display control unit 123 may display the image shown in FIG. 10 as the display image C2.

When the user moves the slider C5 to the left end of the slider bar C4, the setting unit 121 sets the regularization parameter to the minimum value. For example, the first display control unit 123 may display the image shown in FIG. 8 as the display image C2.

Note that the user may input a parameter or the like by using a touch panel or the like. In such a case, the display control apparatus 100a may change the parameter according to the direction of a swiping action or the like performed by a user's finger(s). Note that the inputting operation is not limited to the slider operation using a mouse or the like, and also is not limited to the swiping action.

Note that the second display control unit 124 may display an element(s) such as a button(s), in addition to or in place of the slider bar, on the display unit 140. In such a case, the regularization parameter is set according to the operation (or the action) that the user has performed on the displayed button.

The user can select, by changing the parameter through the operation performed on the slider, the touch panel, or the like, an area that is displayed according to the quality of the area on an area-by-area basis in the fingerprint image in a more flexible manner.

According to this example embodiment, an operator can check the result of the determination of the quality of the fingerprint image, so that he/she can appropriately set the regularization parameter.

Advantageous effects of this example embodiment will be described hereinafter in detail. In a fingerprint image, there are high quality areas and low-quality areas in a mixed manner. Therefore, after corrections are made to the low-quality areas, the corrected fingerprint image is registered in a database.

In this process, there is a problem that if the correction process is also applied to the high-quality areas, the quality of the fingerprint image is lowered. Accordingly, it is possible to register a high-quality fingerprint image in a database by appropriately classifying areas in the fingerprint image according to the quality thereof.

According to this example embodiment, when a user changes a parameter used for the classification according to the quality, the result of the classification into high quality areas and low-quality areas changes. The user can set the parameter to an appropriate value by checking the displayed image. Further, since the low-quality areas are not shown in the display image, there is no need to erase a part(s) of the fingerprint (i.e., a part(s) of the ridges) shown in a defective area(s) in the correction process.

Note that although the above-described example embodiments have been described as hardware configurations, the present disclosure is not limited to the hardware configurations. The present disclosure may also be implemented by causing a CPU to execute a computer program.

In the above-described examples, the program can be stored and provided to a computer using any type of non-transitory computer readable media. Non-transitory computer readable media include any type of tangible storage media. Examples of non-transitory computer readable media include magnetic storage media (floppy disks, magnetic tapes, hard disk drives), optical magnetic storage media (e.g., magneto-optical disks), CD-ROM (Read Only Memory), CD-R, CD-R/W, DVD (Digital Versatile Disc), and semiconductor memories (e.g., mask ROM, PROM (Programmable ROM), EPROM (Erasable PROM), flash ROM, and RAM (Random Access Memory)). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

REFERENCE SIGNS LIST 100, 100a DISPLAY CONTROL APPARATUS
101, 121 SETTING UNIT
102, 122 DETERMINATION UNIT
103, 123 FIRST DISPLAY CONTROL SETTING UNIT
124 SECOND DISPLAY CONTROL UNIT
110 STORAGE UNIT
111 DISPLAY CONTROL PROGRAM
112 TEMPLATE
130 MEMORY
140 DISPLAY UNIT
150 INPUT UNIT

What is claimed is:

1. A display control method comprising:
setting, by a computer, a parameter according to an input of a user;
determining, by the computer, for a plurality of areas of a fingerprint image obtained by dividing the fingerprint image, whether a quality of a ridge pattern in the plurality of areas is satisfactory or not based on the parameter; and
display, by the computer, the fingerprint image according to a result of the determination,
wherein an area among the plurality of areas in which the quality of the ridge pattern is not satisfactory is colored a background color,
wherein a regularization parameter is set in a regression with regularization according to the input, and
wherein fitting for the ridge pattern is performed by using a plurality of template images by the regression with regularization based on the regularization parameter, and it is determined whether the quality of the ridge pattern is satisfactory or not according to a result of the fitting.

* * * * *